(12) United States Patent
Suzuki et al.

(10) Patent No.: US 11,289,754 B2
(45) Date of Patent: Mar. 29, 2022

(54) COOLING STRUCTURE OF BATTERY PACK

(71) Applicant: PRIMEARTH EV ENERGY CO., LTD., Kosai (JP)

(72) Inventors: Ryutaro Suzuki, Hamamatsu (JP); Naoki Fukusako, Toyohashi (JP); Toru Hanaoka, Nagoya (JP); Shozo Fuji, Toyota (JP)

(73) Assignee: PRIMEARTH EV ENERGY CO., LTD., Kosai (JP)

( * ) Notice: Subject to any disclaimer, the term of this patent is extended or adjusted under 35 U.S.C. 154(b) by 53 days.

(21) Appl. No.: 16/825,572

(22) Filed: Mar. 20, 2020

(65) Prior Publication Data

US 2020/0313262 A1    Oct. 1, 2020

(30) Foreign Application Priority Data

Mar. 25, 2019    (JP) .............................. JP2019-056317

(51) Int. Cl.
*H01M 10/6566* (2014.01)
*H01M 10/6557* (2014.01)
*H01M 10/613* (2014.01)
*H01M 50/30* (2021.01)

(52) U.S. Cl.
CPC ..... *H01M 10/6566* (2015.04); *H01M 10/613* (2015.04); *H01M 10/6557* (2015.04); *H01M 50/30* (2021.01)

(58) Field of Classification Search
CPC .................................................. H01M 50/30
See application file for complete search history.

(56) References Cited

U.S. PATENT DOCUMENTS

2002/0197527 A1* 12/2002 Moores, Jr. ......... H01M 10/653
429/120
2010/0310909 A1* 12/2010 Yun ..................... H01M 10/647
429/90

FOREIGN PATENT DOCUMENTS

JP    2009-004319 A    1/2009
JP    2017-183240 A    10/2017

OTHER PUBLICATIONS

JP Office Action in Application No. 2019-056317 dated Dec. 7, 2021.

* cited by examiner

*Primary Examiner* — Jimmy Vo
(74) *Attorney, Agent, or Firm* — Maschoff Brennan

(57) ABSTRACT

A cooling structure of a battery pack includes an assembled battery including stacked battery modules, an intake passage, and a discharge passage. Ventilation passages extend between adjacent ones of the battery modules. The intake passage extends in a stacking direction of the battery modules and includes an intake port to draw in cooling air from a blower. The discharge passage extends in the stacking direction and includes a discharge port at a first end to discharge the cooling air, which flows through the ventilation passages, to the outside. The first end of the discharge passage and the intake port of the intake passage are located at the same side. The discharge passage is defined by a wall that includes a communication portion disposed at a position toward a second end of the discharge passage opposite to the first end to partially discharge air from the exhaust passage.

6 Claims, 5 Drawing Sheets

COOLING STRUCTURE OF BATTERY PACK

BACKGROUND

1. Field

The following description relates to a cooling structure of a battery pack that cools an assembled battery accommodated in the battery pack.

2. Description of Related Art

A battery pack including an assembled battery is mounted on typical vehicles such as an electric car or a hybrid car. The assembled battery includes multiple battery modules that are combined with each other. Each battery module is configured by multiple battery cells.

Increases in temperature caused by, for example, charging and discharging, lower the performance of the battery cells. The battery pack has an air-cooling type of cooling structure to limit increases in the temperature of the battery cells. Thus, the performance of the assembled battery is maintained. In addition, when variations in the temperature between battery modules are increased, the charging state may vary between the battery modules. Some of the battery modules may be overcharged or overdischarged. Such overcharging or overdischarging in some of the battery modules may restrict the battery properties of the assembled battery. Therefore, in addition to simply cooling the battery cells, the assembled battery needs to be evenly cooled.

Japanese Laid-Open Patent Publication No. 2017-183240 describes a cooling structure has an intake chamber, ventilation passages extending between battery modules, and a discharge chamber to evenly cool an assembled battery. In this cooling structure, a chamber inner protrusion is arranged in the vicinity of an inlet of the intake chamber, into which cooling air flows. The chamber inner protrusion increases static pressure in the vicinity of the inlet of the intake chamber to limit unevenness of the static pressure of the intake chamber. This limits variations in the air flow amount between the battery modules, thereby evenly cooling the assembled battery.

In the cooling structure described in Japanese Laid-Open Patent Publication No. 2017-183240, the chamber inner protrusion is arranged in the intake chamber. However, arrangement of a chamber inner protrusion may be difficult due to limitations imposed on the structure and size of an intake chamber.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is a cooling structure of a battery pack. The cooling structure includes, in the battery pack, an assembled battery including multiple battery modules that are stacked. A ventilation passage extends between each of the multiple battery modules and an adjacent one of the multiple battery modules. The assembled battery includes a first surface in which the ventilation passage is open and a second surface in which the ventilation passage is open. The second surface is opposite to the first surface. The cooling structure further includes an intake passage disposed at the first surface of the assembled battery and a discharge passage disposed at the second surface of the assembled battery. The intake passage extends in a direction in which the multiple battery modules are stacked. The intake passage includes an intake port disposed at a first end of the intake passage in a longitudinal direction to draw in cooling air that is output from a blower. The discharge passage extends in the direction in which the multiple battery modules are stacked. The discharge passage includes a discharge port at a first end of the discharge passage in a longitudinal direction to discharge the cooling air, which flows through the ventilation passage, to an outside. The first end of the discharge passage and the intake port of the intake passage are located at the same side. The discharge passage is defined by a wall that includes a communication portion. The communication portion is disposed at a position toward a second end of the discharge passage opposite to the first end of the discharge passage to partially discharge air from the exhaust passage.

Another aspect of the present disclosure is a cooling structure of a battery pack. The cooling structure includes, in the battery pack, an assembled battery including multiple battery modules that are stacked. A ventilation passage extends between each of the multiple battery modules and an adjacent one of the multiple battery modules. The assembled battery includes a first surface in which the ventilation passage is open and a second surface in which the ventilation passage is open. The second surface is opposite to the first surface. The cooling structure further includes an intake passage disposed at the first surface of the assembled battery and a discharge passage disposed at the second surface of the assembled battery. The intake passage extends in a direction in which the multiple battery modules are stacked. The intake passage includes an intake port disposed at a first end of the intake passage in a longitudinal direction to draw in cooling air that is output from a blower. The discharge passage extends in the direction in which the multiple battery modules are stacked. The discharge passage includes two discharge ports at opposite ends of the discharge passage in a longitudinal direction to discharge the cooling air, which flows through the ventilation passage, to an outside. The discharge passage is defined by a wall that includes a communication portion. The communication portion is disposed in a longitudinal central portion of the discharge passage at a position toward a first end of the discharge passage to partially discharge air from the exhaust passage. The first end of the discharge passage and the intake port of the intake passage are located at the same side.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a cooling structure of a battery pack will now be described with reference to FIGS. 1 to 4. An example of a battery pack 10 is mounted on a vehicle such as an electric car or a hybrid car to supply power to an electric motor or the like.

Figure 1:
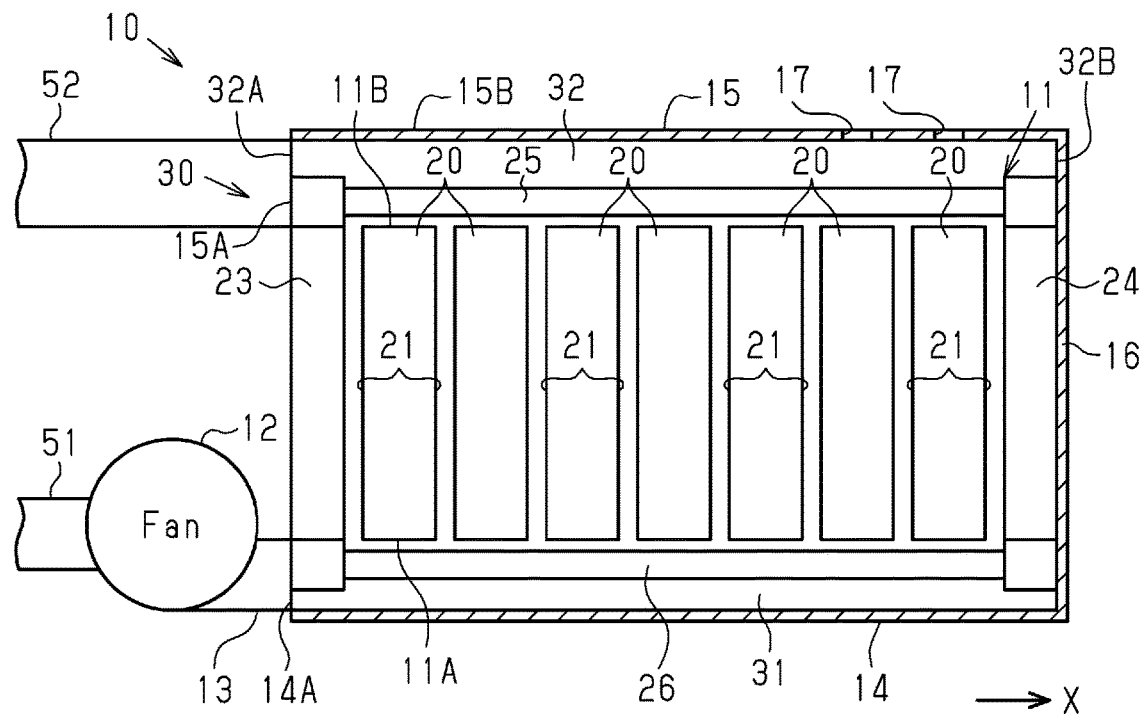
FIG. 1 is a diagram showing a cross-sectional structure of a battery pack including a U-turn cooling structure in a first embodiment of a cooling structure of a battery pack.

As shown in FIG. 1, the battery pack 10 includes an assembled battery 11. The assembled battery 11 is configured by multiple battery modules 20. Each battery module 20 includes walls having a relatively large surface area. The battery modules 20 are arranged in a certain direction so that the walls of adjacent ones of the battery modules 20 are opposed to each other. The surfaces of the walls having a relatively large surface area are used as heat dissipation surfaces. The battery module 20 is a nickel-metal hydride rechargeable battery or a lithium-ion rechargeable battery. An example of the battery module 20 is a sealed battery having a rectangular-box shape. In the following description, the direction in which the battery modules 20 are arranged is referred to as a stacking direction. In FIG. 1, the stacking direction is the X-direction. Although FIG. 1 shows the assembled battery 11 in which seven battery modules 20 are stacked, the number of battery modules 20 that configure the assembled battery 11 may be other than seven.

The assembled battery 11 includes two end plates 23 and 24 that sandwich the battery modules 20 and two joint bars 25 and 26 that join the end plates 23 and 24. When the end plates 23 and 24 are joined by each of the joint bars 25 and 26, the battery modules 20 are fixed. Ventilation passages 21 extend between adjacent ones of the battery modules 20. In addition, a ventilation passage 21 extends between the end plate 23 and the battery module 20 that is opposed to the end plate 23. In addition, a ventilation passage 21 extends between the end plate 24 and the battery module 20 that is opposed to the end plate 24. In an example, the end plate 23, the battery modules 20, and the end plate 24 are spaced apart from each other in this order. The ventilation passages 21 are open in a first surface 11A and a second surface 11B of the assembled battery 11, which are respectively the lower surface and the upper surface in FIG. 1. More specifically, the first surface 11A and the second surface 11B are located on opposite sides of the assembled battery 11. In an example, at least a portion of the first surface 11A is configured by surfaces of the battery modules 20 that are opposed to the joint bar 26, and at least a portion of the second surface 11B is configured by surfaces of the battery modules 20 that are opposed to the joint bar 25.

The battery pack 10 further includes a cooling structure 30 of air-cooling type that cools the assembled battery 11. The cooling structure 30 includes an intake chamber 14, a discharge chamber 15, and the ventilation passage 21.

The intake chamber 14 is elongated. The intake chamber 14 is arranged so that the longitudinal direction of the intake chamber 14 extends parallel or substantially parallel to the stacking direction X of the assembled battery 11. An intake passage 31 extends in the intake chamber 14 in the longitudinal direction of the intake chamber 14. The intake chamber 14 is disposed at the first surface 11A of the assembled battery 11 where the ventilation passages 21 are open.

The intake chamber 14 has a first end and a second end opposite to the first end in the longitudinal direction (extension direction) and includes an intake port 14A formed at the first end and a wall 16 disposed at the second end. The second end of the intake passage 31 is closed by the wall 16. The intake port 14A is joined to a fan 12 through a supply passage 13. An example of the fan 12 is a centrifugal blower. The fan 12 draws in air through an intake duct 51 and supplies the air as cooling air to the intake passage 31 through the supply passage 13.

The discharge chamber 15 is elongated. The discharge chamber 15 is arranged so that the longitudinal direction of the discharge chamber 15 extends parallel or substantially parallel to the stacking direction X of the assembled battery 11. The discharge chamber 15 may include, for example, a lower member located toward the assembled battery 11 and an upper member located above the lower member. The lower member and the upper member may be coupled to form an inner space defining a discharge passage 32. The discharge chamber 15 and the intake chamber 14 have substantially the same length. The discharge passage 32 extends in the discharge chamber 15 in a longitudinal direction of the discharge chamber 15. The discharge chamber 15 is disposed at the second surface 11B of the assembled battery 11 where the ventilation passages 21 are open.

The discharge chamber 15 has a first end and a second end opposite to the first end in the longitudinal direction (extension direction) and includes a discharge port 15A formed at the first end and a wall 16 disposed at the second end. The discharge port 15A is connected to a discharge duct 52. The discharge passage 32 has a second end 32B closed by the wall 16. More specifically, the discharge port 15A of the discharge chamber 15 and the intake port 14A of the intake chamber 14 are located at the same side (left side in FIG. 1) of the discharge passage 32 and the intake passage 31, which extend parallel or substantially parallel to each other.

Figure 2:
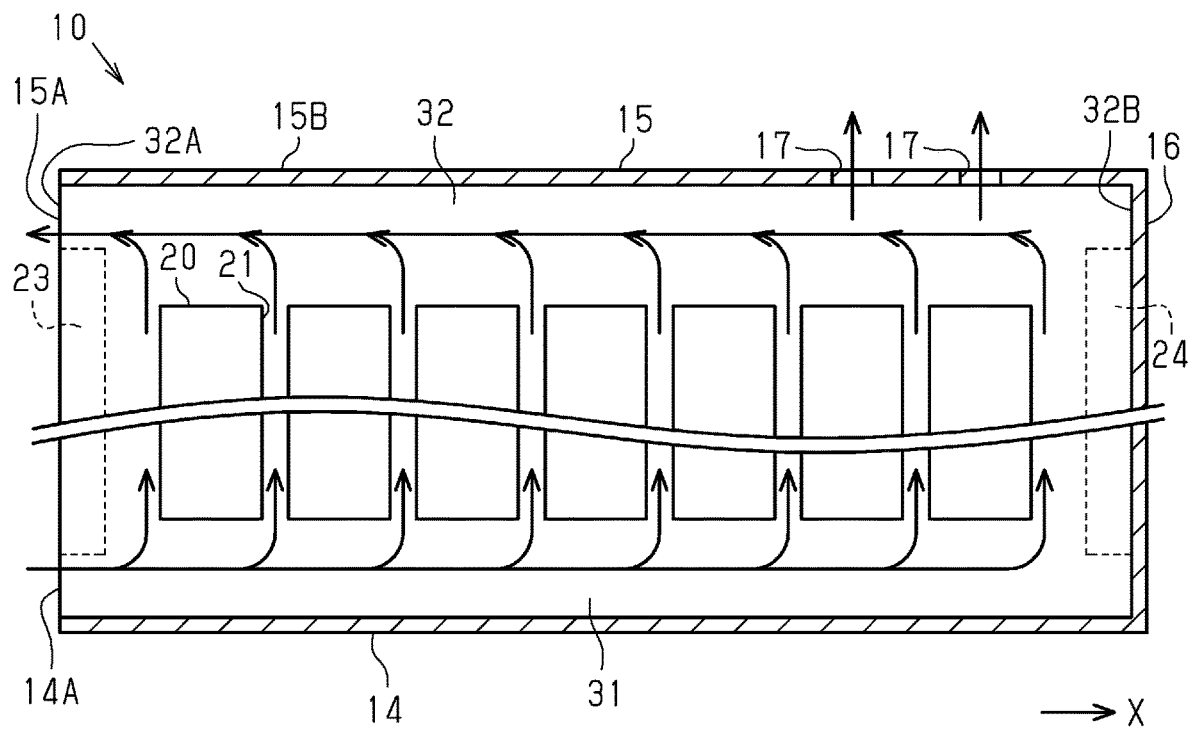
FIG. 2 is a schematic diagram showing a flow of cooling air in the cooling structure of the first embodiment.

Walls defining the discharge passage 32 include a wall 15B extending in the longitudinal direction of the discharge chamber 15. The wall 15B includes two holes 17. When the discharge chamber 15 is configured by the lower member and the upper member, the gap between the lower member and the upper member may be used as the holes 17. In this case, the holes 17 are disposed in lateral sides of the discharge chamber 15 (rear and front of the plane of the drawing). The two holes 17 are located at different positions in the stacking direction of the assembled battery 11. The holes 17 may have a circular opening or a slit-shaped opening that extends rearward from the plane of the drawing. The diameter of the holes 17 is constant in the thicknesswise direction of the wall 15B. The discharge passage 32 is in communication with the outside of the battery pack 10 through the holes 17. The holes 17 correspond to a communication portion. FIGS. 1 and 2 show the positions of the holes 17 in the longitudinal direction of the discharge chamber 15. The holes 17 may be formed in the wall 15B, which is located at the upper side in FIGS. 1 and 2, or may be formed in the lateral sides of the discharge chamber 15 (rear and front of the plane of the drawing).

Figure 3:
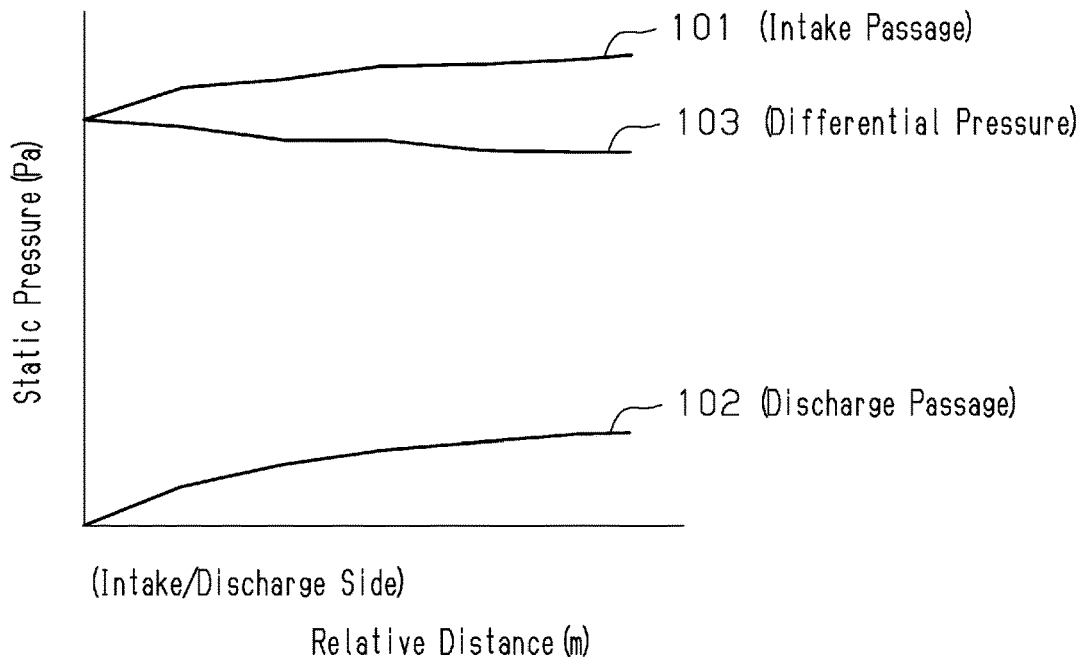
FIG. 3 is a graph showing a differential pressure between static pressures of an intake passage and a discharge passage in a typical battery pack.

The operation of the cooling structure of the battery pack 10 will now be described with reference to FIGS. 2 to 4 in comparison with a cooling structure of a typical battery pack 10.

FIG. 2 shows directions in which the cooling air flows in the battery pack 10. In FIG. 2, the end plates 23 and 24 are indicated by broken lines, and the joint bars 25 and 26 are not shown for the sake of convenience. The cooling air drawn in from the intake port 14A mainly flows through the intake passage 31 in the stacking direction of the battery modules 20 and is distributed to the ventilation passages 21. The cooling air distributed to each ventilation passage 21 removes heat from the battery modules 20 in contact with the walls of the battery modules 20 and flows into the discharge chamber 15. The cooling air in the discharge chamber 15 mainly flows through the discharge passage 32 and discharges from the discharge port 15A in a direction that is parallel to the stacking direction and opposite to the stacking direction (counter X-direction). That is, the direction of the cooling air flowing through the intake passage 31 is substantially opposite to the direction of the cooling air flowing through the discharge passage 32. In such a structure, the cooling air flows in from the intake port 14A, which is located at the first end of the intake passage 31, flows through the ventilation passages 21, and discharges from the discharge port 15A, which is located at the first end of the discharge passage 32, that is, the same side as the intake port 14A. Such a cooling structure is referred to as a U-turn cooling structure.

The holes 17, which are disposed in the wall 15B defining the discharge passage 32, discharge air from the discharge passage 32 to the outside of the battery pack 10 at positions close to the second end 32B. The holes 17 are located at positions toward the second end 32B, which is opposite to a first end 32A of the discharge passage 32 located at the discharge port 15A. In this specification, "positions toward the second end 32B" refers to the holes 17 being located in a region between the second end 32B and the middle of the discharge passage 32. More preferably, the holes 17 may be located in positions between the middle of the region and the second end 32B. More preferably, the holes 17 may be located in the discharge passage 32 proximate to the second end 32B.

Pressures of the intake passage 31 and the discharge passage 32 will now be described. Since the intake passage 31 is located upstream of the discharge passage 32, the pressure of the intake passage 31 is greater than the pressure of the discharge passage 32. The pressure refers to static pressure.

When the air blow amount of the fan 12 is set to be fixed, in the intake chamber 14 and the discharge chamber 15, the static pressure is likely to be low where the flow rate is high and is likely to be high where the flow rate is low.

The amount of cooling air flowing through the ventilation passages 21 changes in accordance with the difference in static pressure between the intake passage 31 and the discharge passage 32. More specifically, when the differential pressure is increased, the amount of air flowing through the ventilation passages 21 increases. When the differential pressure is decreased, the amount of air flowing through the ventilation passages 21 decreases.

In the cooling structure of the typical battery pack, the differential pressure varies widely in the stacking direction of the assembled battery 11.

The differential pressure between the intake passage 31 and the discharge passage 32 will now be described with reference to FIG. 3. FIG. 3 is a graph showing a differential pressure generated in the typical battery pack after the cooling air is supplied from the fan 12 for a fixed time. The typical battery pack differs from the battery pack 10 of the present embodiment in that the discharge chamber 15 does not include the two holes 17. The horizontal axis of the graph corresponds to a distance (m) relative to the intake port 14A and a distance (m) relative to the discharge port 15A. The vertical axis corresponds to static pressure (Pa). Pressure lines 101 and 102 are obtained by fluid analysis and respectively show changes in the static pressure of the intake passage 31 and changes in the static pressure of the discharge passage 32. Differential pressure line 103 shows values obtained by subtracting the static pressure of the discharge passage 32 from the static pressure of the intake passage 31 at the same position in the stacking direction (X-direction in FIG. 1) in correspondence with the relative distance in the stacking direction.

As indicated by pressure line 101, the flow rate of the cooling air is high and the static pressure is low in the vicinity of the intake port 14A, that is, immediately after the cooling air flows in the intake passage 31. As the cooling air flows form the intake port 14A through the intake passage 31, the flow rate of the cooling air is decreased. The flow rate reaches zero at the closed second end. Hence, the static pressure is high at the second end of the intake passage 31. As indicated by pressure line 102, in the vicinity of the discharge port 15A of the discharge chamber 15, the flow rate is high and thus the static pressure is low. The flow rate reaches zero at the closed second end. Hence, the static pressure is high at the second end of the discharge passage 32.

As described above, in each of the intake chamber 14 and the discharge chamber 15, the static pressure is likely to increase as the distance relative to the intake port 14A or the distance relative to the discharge port 15A increases. Therefore, it is typically considered that the differential pressure does not vary widely in the stacking direction. However, as shown in FIG. 3, fluid analysis found that the differential pressure may decrease as the relative distance increases. More specifically, as indicated by pressure line 101, in the intake passage 31, the static pressure is increased by 10 to 15 Pa from the intake port 14A toward the second end, which is opposite to the intake port 14A. In the discharge passage 32, the static pressure is increased from 1.5 times to 2 times the static pressure of the intake passage 31 from the discharge port 15A toward the second end, which is opposite to the discharge port 15A. More specifically, since the static pressure of the discharge passage 32 tends to largely increase from the discharge port 15A to the second end, the differential pressure between the intake passage 31 and the discharge passage 32 may decrease. Although the reason has not been specified in detail, bending and disturbance of the cooling air in the discharge passage 32 may be a cause.

As described above, the differential pressure is decreased as the distance relative to the intake port 14A and the distance relative to the discharge port 15A increase. Therefore, the amount of air flowing in the ventilation passages 21 that are open in positions of the discharge passage 32 toward the second end is less than the amount of air flowing in the ventilation passages 21 that are located close to the intake port 14A and the discharge port 15A. Such differences in the amount of air flowing in the ventilation passages 21 produce variations in temperature between the battery modules 20.

In the battery pack 10 of the first embodiment, the two holes 17 are formed in the discharge passage 32 at positions toward the second end 32B. The holes 17 allow air to discharge from the discharge passage 32 at the second end 32B, where the static pressure is particularly increased, to the outside of the battery pack 10. As a result, the static pressure is appropriately decreased at the second end 32B of the discharge passage 32.

Figure 4:
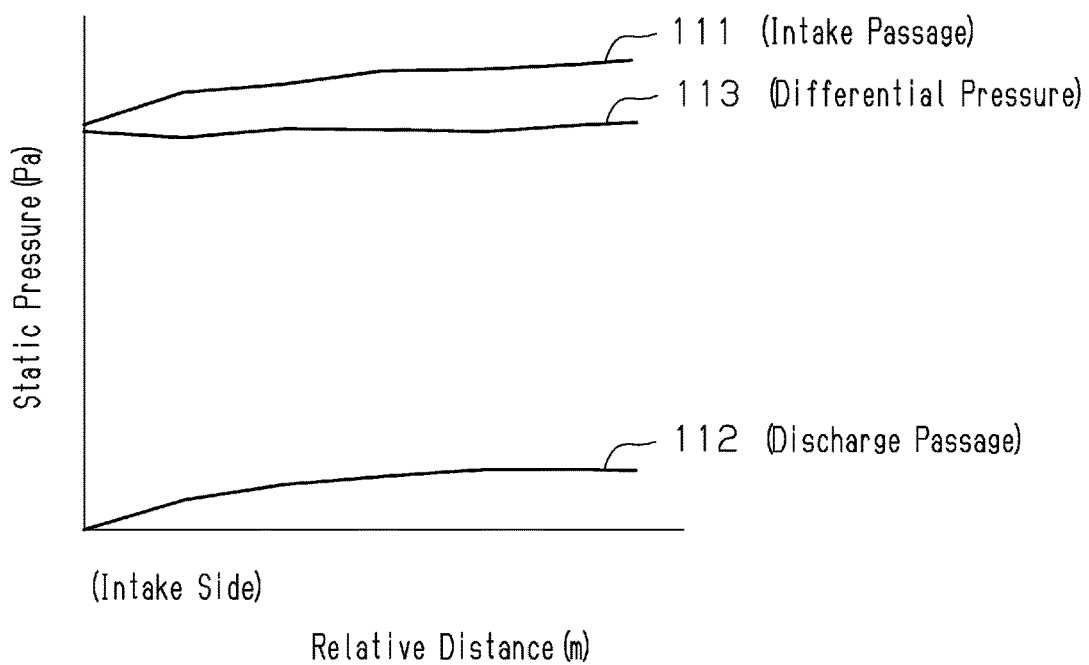
FIG. 4 is a graph showing a differential pressure between static pressures of an intake passage and a discharge passage in the cooling structure of the first embodiment.

FIG. 4 is a graph showing a differential pressure generated in the battery pack 10 of the first embodiment after the cooling air is supplied from the fan 12 for a fixed time. Pressure lines 111 and 112 are obtained by fluid analysis and respectively show changes in the static pressure at multiple positions of the intake passage 31 in the longitudinal direction and changes in the static pressure at multiple positions of the discharge passage 32 in the longitudinal direction. Differential pressure line 113 shows the difference in pressure. In the first embodiment, the wall 15B of the discharge chamber 15 includes the two holes 17. As indicated by pressure line 112, the static pressure is decreased at positions of the discharge chamber 15 toward the second end, which is opposite to the discharge port 15A. Therefore, as indicated by differential pressure line 113, increases in the differential pressure at the second end, which is opposite to the discharge port 15A, are limited as compared with differential pressure line 103 shown in FIG. 3. As a result, the differential pressure does not largely change in the stacking direction. This limits variations in the amount of air flowing through the ventilation passages 21, which are arranged in the stacking direction, thereby limiting variations in temperature between the battery modules 20. The holes 17, which are used to limit variations in temperature between the battery modules 20, are disposed in the wall 15B of the discharge chamber 15. That is, the holes 17 are not an inner structure of the battery pack 10. This increases the degree of freedom for the layout in the battery pack 10.

In the inner space of the vehicle where the battery pack 10 is installed, a heat source such as a vehicle engine is also mounted. The heat source heats the air in the space where the battery pack 10 is installed. When the fan 12 is driven, the heated air is drawn into the battery pack 10 as the cooling air. Experiments have shown that the temperature of the intake passage 31 increases at the second end, which is opposite to the intake port 14A. The high-temperature air at the second end of the intake passage 31 mainly flows into the ventilation passages 21 that are distant from the intake port 14A, that is, the ventilation passages 21 located inward as viewed from the intake port 14A. This lowers the cooling effect of the battery modules 20 defining these ventilation passages 21 and produces variations in temperature between the battery modules 20.

The holes 17 discharge air from the discharge passage 32 at the end where the high-temperature cooling air flows in, that is, at the second end 32B. This decreases the static pressure at the second end 32B and also facilitates releasing of heat. Variations in temperature between the battery modules 20 are further limited.

The advantage of the first embodiment will now be described.

(1) The discharge chamber 15 is provided with the two holes 17 in positions toward the second end 32B, which is opposite to the first end provided with the discharge port 15A. The two holes 17 are communication portions that partially discharge the air. The static pressure is appropriately lowered at the second end 32B, and unevenness of the static pressure in the longitudinal direction of the discharge passage 32 is limited. This limits a large change in the differential pressure, which is the difference in the static pressure between the intake passage 31 and the discharge passage 32, in the stacking direction. Such limitation of a large change in the differential pressure limits variations in air flow amount between the ventilation passages 21 extending between the battery modules 20, thereby limiting variations in temperature between the battery modules 20. The holes 17 are disposed in the wall 15B defining the discharge passage 32. Thus, the degree of freedom of the layout in the battery pack 10 is increased as compared with a structure in which, for example, a protrusion is arranged in the intake passage 31.

Second Embodiment

A second embodiment will now be described with reference FIG. 5. The second embodiment includes two holes 17 in the wall 15B of the discharge chamber 15 in the same manner as the first embodiment but differs from the first embodiment in the configuration of the holes 17. In the following description, differences from the first embodiment will mainly be described. Similar configurations will not be described in detail for the sake of convenience.

Figure 5:
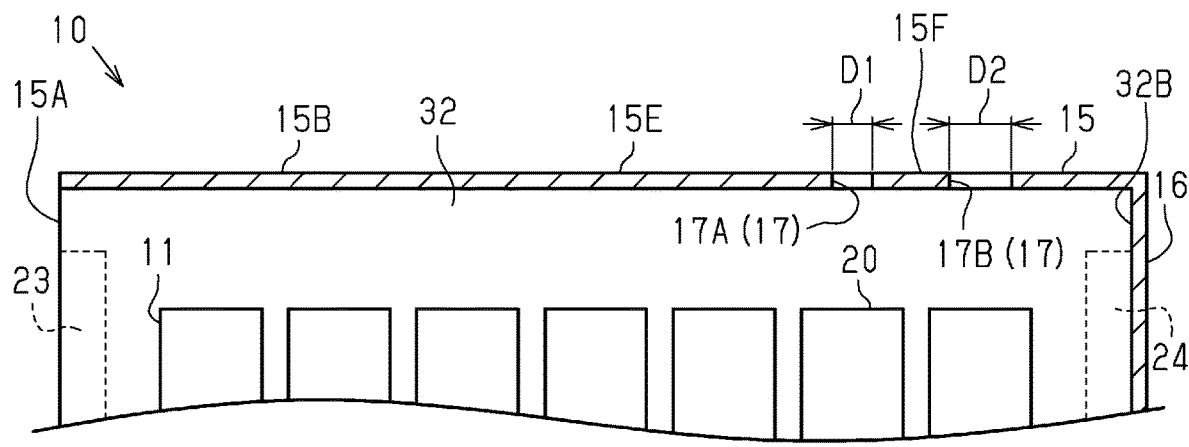
FIG. 5 is a schematic diagram showing a second embodiment of a cooling structure of a battery pack.

As shown in FIG. 5, the wall 15B includes the two holes 17. The hole 17 located toward the discharge port 15A of the discharge chamber 15 is referred to as a hole 17A (first hole). The hole 17 located toward the second end 32B is referred to as the hole 17B (second hole). The holes 17 may have a circular opening or a slit-shaped opening that extends rearward from the plane of the drawing. The diameter of the hole 17A is constant in the thickness-wise direction of the wall 15B. The diameter of the hole 17B is also constant in the thickness-wise direction of the wall 15B. The diameter D2 of the hole 17B is greater than the diameter D1 of the hole 17A. More specifically, the hole 17B has a larger open area than the hole 17A in both the surface of the wall 15B located toward the discharge passage 32 and the opposite surface of the wall 15B.

When the open area of the hole 17B, which is located toward the second end 32B, is increased, the static pressure is further decreased at the second end 32B of the discharge passage 32. In addition, air is discharged through the holes 17 from positions near the second end 32B, where the temperature is particularly increased, so that releasing of heat is further facilitated. As a result, variations in temperature between the battery modules 20 are limited.

The second embodiment has the following advantages in addition to advantage (1) of the first embodiment.

(2) The hole 17B is located closer than the hole 17A to the second end 32B of the discharge passage 32, which is opposite to the first end 32A provided with the discharge port 15A, and has a larger open area than the hole 17A. This further limits increases in the static pressure at the second end 32B of the discharge passage 32 and lowers the temperature at the second end 32B.

Third Embodiment

A third embodiment will now be described with reference FIGS. 6 to 8. The third embodiment includes two holes 17 in the wall 15B of the discharge chamber 15 in the same manner as the first embodiment but differs from the first embodiment in the overall cooling structure. In the following description, differences from the first embodiment will mainly be described. Similar configurations will not be described in detail for the sake of convenience.

Figure 6:
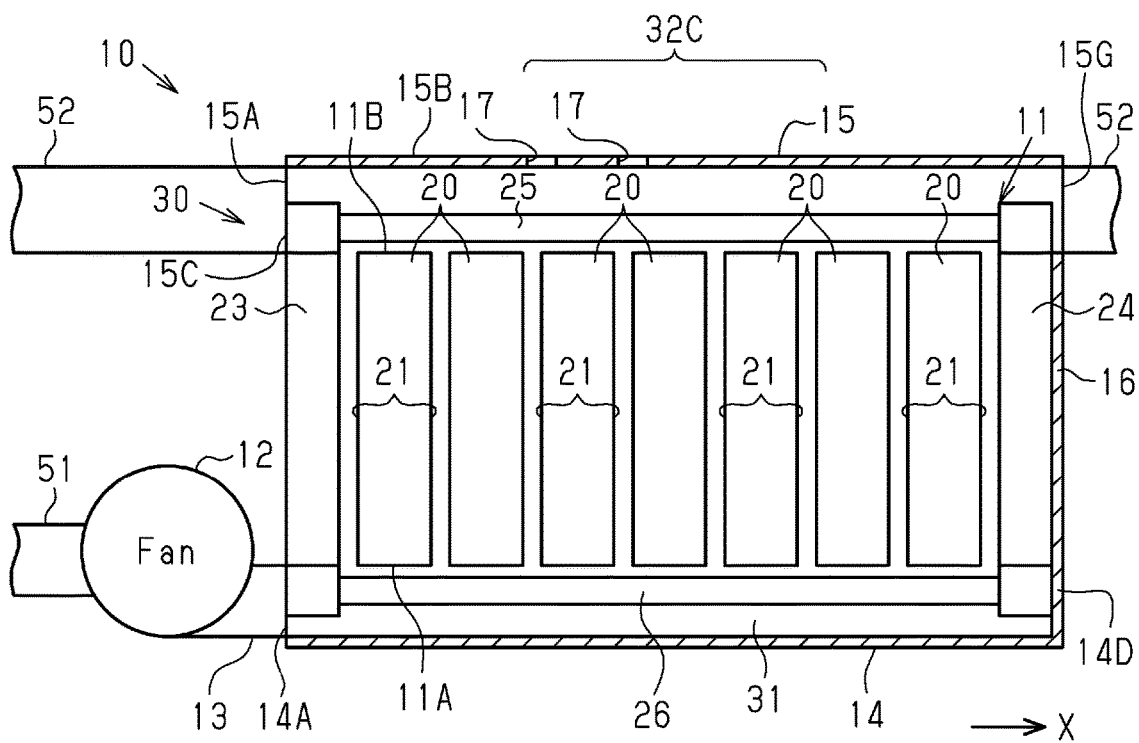
FIG. 6 is a diagram showing a cross-sectional structure of a battery pack having a dual-sided-discharging cooling structure in a third embodiment of a cooling structure of a battery pack.
Figure 7:
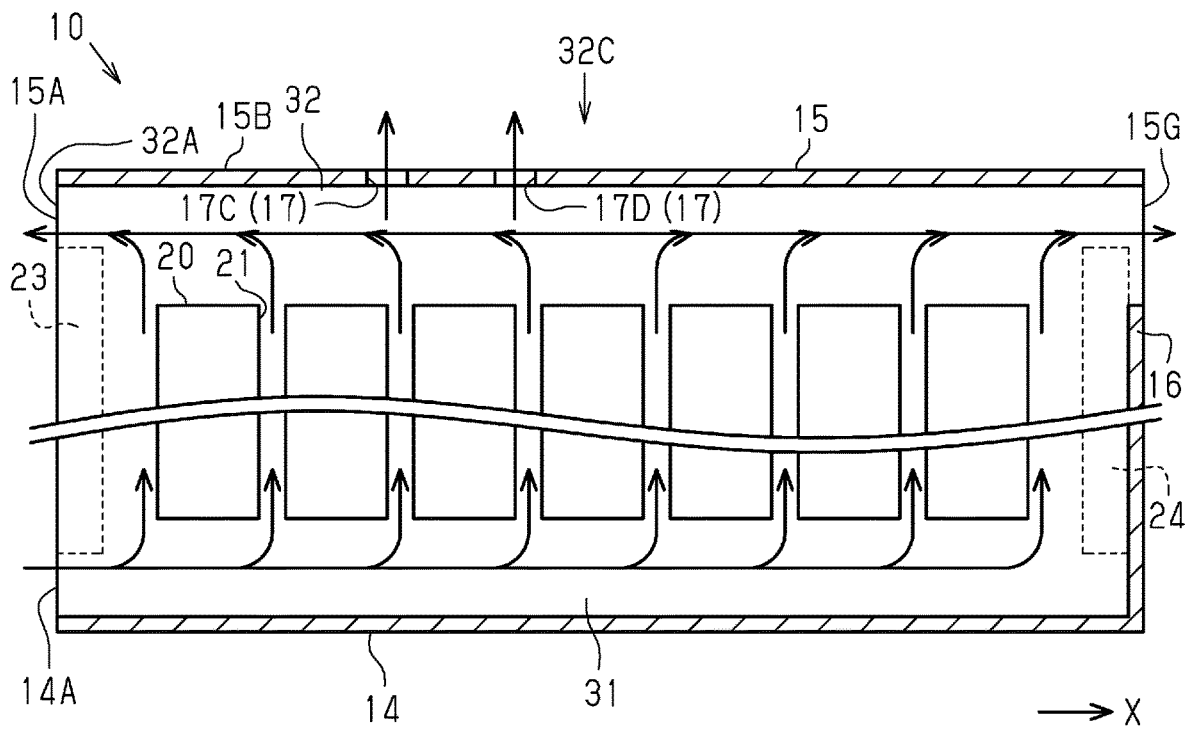
FIG. 7 is a schematic diagram showing a flow of cooling air in the cooling structure of the third embodiment.

As shown in FIG. 6, the intake chamber 14 includes an intake port 14A at the first end in the longitudinal direction (extension direction). The intake chamber 14 has a second end 14D opposite to the first end in the longitudinal direction. The second end 14D is closed by the wall 16. The discharge chamber 15 includes discharge ports 15A and 15G at opposite ends in the longitudinal direction. The discharge port 15A is located close to the intake port 14A. The discharge port 15G is located farther from the intake port 14A than the discharge port 15A. The discharge ports 15A and 15G are connected to respective discharge ducts 52. The wall 15B of the discharge chamber 15 includes two holes 17. FIGS. 6 and 7 show the positions of the holes 17 in the longitudinal direction of the discharge chamber 15. The holes 17 may be formed in the wall 15B, which is located at the upper side in FIGS. 6 and 7, or may be formed in the lateral sides of the discharge chamber 15 (rear and front of the plane of the drawing).

The holes 17 are disposed in a region of the wall 15B corresponding to a longitudinal central portion 32C of the discharge passage 32 at positions toward the discharge port 15A. In this specification, "positions toward the discharge port 15A" refers to the holes 17 being located toward the discharge port 15A from the middle of the central portion 32C in the longitudinal direction of the discharge passage 32. The central portion 32C is the center section of the discharge passage 32 when equally divided into three sections. More preferably, the holes 17 may be located in the end of the central portion 32C located closer to the discharge port 15A.

The operation of the cooling structure of the battery pack 10 will now be described with reference to FIGS. 7 and 8. As shown in FIG. 7, the cooling air drawn into the intake passage 31 flows in the stacking direction of the battery modules 20 and is distributed to the ventilation passages 21. In the discharge passage 32, the cooling air is divided in two directions, flows in the stacking direction (X-direction in FIG. 7) and the opposite direction (counter X-direction), and discharges from the discharge ports 15A and 15G. As described above, the cooling structure in which the cooling air enters from an end of the battery pack 10, flows through the ventilation passages 21, and discharges from opposite ends of the discharge chamber 15 is referred to as the dual-sided-discharging cooling structure.

In the dual-sided-discharging cooling structure, since the discharge ports 15A and 15G are disposed on opposite sides of the discharge chamber 15, it was expected that the differential pressure does not largely change in the longitudinal direction of the discharge passage 32. However, in the central portion 32C of the discharge passage 32, the static pressure tends to be locally high particularly at a position toward the discharge port 15A. This shows that the differential pressure between the intake passage 31 and the discharge passage 32 is decreased at this position. It is considered that the reason for the local increase in the static pressure at positions of the central portion 32C toward the discharge port 15A is that the central portion 32C is distant from the discharge ports 15A and 15G in the discharge passage 32 and thus tends to have a relatively high static pressure. In particular, the positions toward the discharge port 15A are close to the intake port 14A of the intake chamber 14, so that air is likely to remain in the positions. In this regard, the two holes 17 are disposed in the central portion 32C at positions toward the discharge port 15A. The holes 17 allow air to discharge to the outside of the battery pack 10 from the vicinity of the holes 17. As a result, the static pressure is appropriately decreased at a location having a high local pressure.

Figure 8:
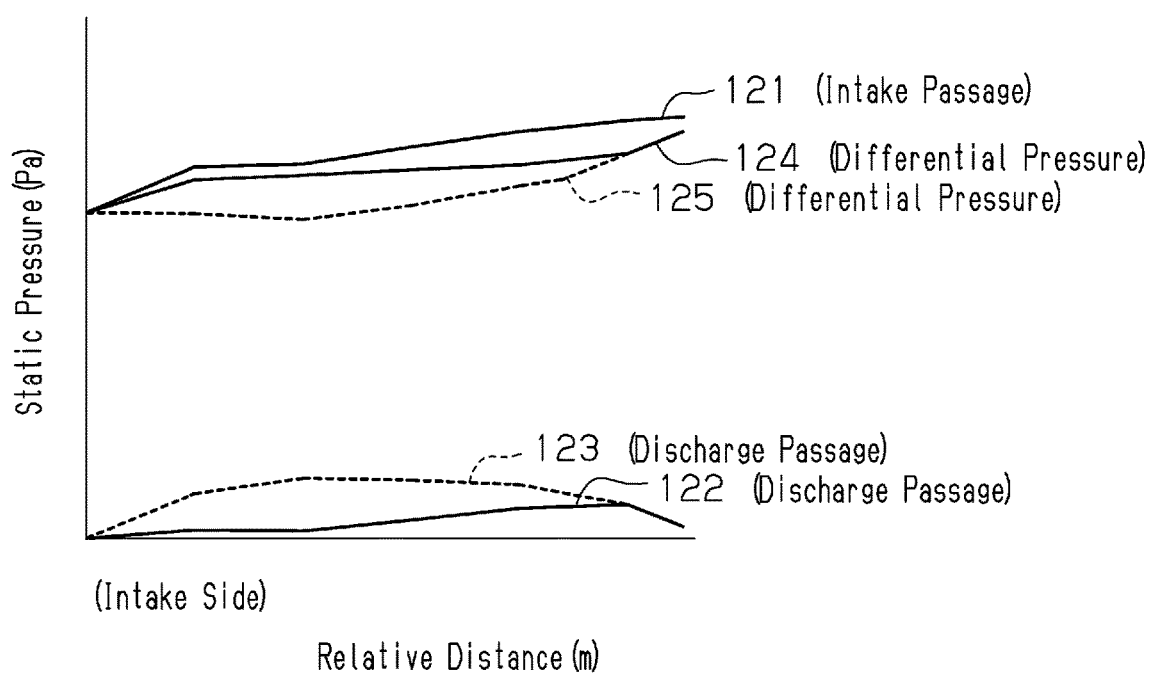
FIG. 8 is a graph showing a differential pressure between static pressures between an intake passage and a discharge passage in the cooling structure of the third embodiment.

FIG. 8 is a graph showing a differential pressure generated in the battery pack 10 of the present embodiment after the cooling air is supplied from the fan 12 for a fixed time. Pressure lines 121 and 122 indicated by solid lines show changes in the static pressure of the intake passage 31 in the longitudinal direction and changes in the static pressure of the discharge passage 32 in the longitudinal direction. Pressure line 123 indicated by a broken line shows changes in the pressure of a discharge passage 32 that does not include the holes 17. Differential pressure line 124 indicated by a solid line shows the difference in pressure between pressure lines 121 and 122. Differential pressure line 125 indicated by a broken line shows the differential pressure between the intake passage 31 and the discharge passage 32 of the discharge chamber 15 that does not include the holes 17.

Pressure line 123 indicated by a broken line shows that the static pressure is increased toward the central portion. Pressure line 122 indicated by a solid line shows that the static pressure of the central portion is lower than that of pressure line 123. Hence, differential pressure line 124 indicated by a solid line is flatter than differential pressure line 125 indicated by a broken line and shows that the differential pressure does not largely change. As described above, when the dual-sided-discharging cooling structure includes the two holes 17 in locations having a high local pressure, a large change in the differential pressure in the stacking direction is limited.

The third embodiment has the following advantages.

(3) In the dual-sided-discharging cooling structure 30, the two holes 17 are the communication portions and are located in a region of the wall 15B defining the discharge passage 32 corresponding to the longitudinal central portion 32C of the discharge passage 32 at positions toward the first end 32A, which is located at the same side as the intake port 14A. This decreases the static pressure at a location particularly having a high pressure, thereby decreasing the static pressure of the central portion of the discharge passage 32. This limits a large change in the differential pressure, which is the difference in the static pressure between the intake passage 31 and the discharge passage 32. Such limitation of a large change in the differential pressure limits variations in air flow amount between the ventilation passages 21 extending between the battery modules 20, thereby limiting variations in temperature between the battery modules 20. The holes 17 are disposed in the wall 15B defining the discharge passage 32. This increases the degree of freedom of the layout in the battery pack 10 as compared with a structure in which, for example, a protrusion is arranged in the intake passage 31.

The embodiments may be modified as follows. The embodiments and the following modified examples can be combined as long as the combined modified examples remain technically consistent with each other.

In the third embodiment, the holes 17A and 17B may have different open areas compared to the second embodiment. More specifically, the hole 17A, which is located toward the discharge port 15A, may have a larger open area than the hole 17B, which is located toward the second end 32B. This limits increases in the static pressure of the central portion 32C of the discharge passage 32 and releases heat from the air in the central portion 32C where the temperature is locally increased.

Figure 9A:
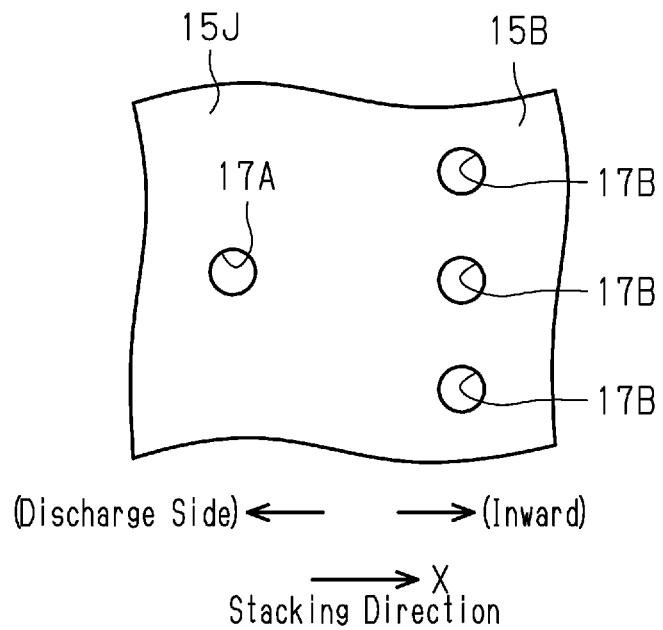
FIG. 9A is a diagram showing the layout of holes in a U-turn cooling structure in a modified example of a cooling structure of a battery pack.
Figure 9B:
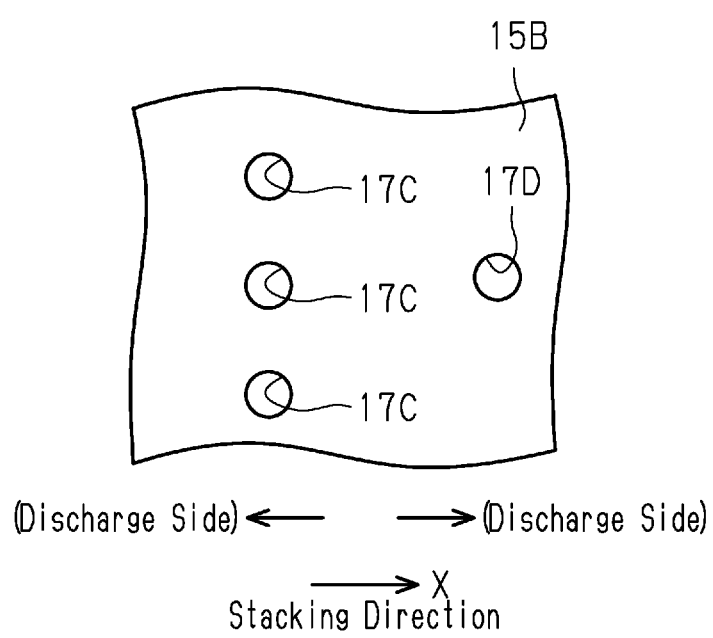
FIG. 9B is a diagram showing the layout of holes in a dual-sided-discharging cooling structure in a modified example of a cooling structure of a battery pack.

As shown in FIG. 9, the number of holes 17 in the discharge chamber 15 may be changed in accordance with positions. FIG. 9A shows a portion of a U-turn cooling structure showing a surface of the wall 15B located at the discharge passage 32. In the same manner as the second embodiment, the hole 17 located toward the discharge port 15A is referred to the hole 17A, and the holes 17 located (inward) toward the second end 32B, which is opposite to the discharge port 15A, are referred to as the holes 17B. The hole 17A and the holes 17B have the same diameter. The hole 17A differs from the holes 17B in number. The holes 17B may be disposed at an inner side of the wall 15B, that is, at a side closer to the second end 32B than the hole 17A. For example, the holes 17B are aligned in the same position in the stacking direction X and arranged next to each other in a direction orthogonal to the stacking direction X. The sum of open areas of the holes 17B is greater than the open area of the hole 17A. A large amount of air is discharged from the discharge passage 32 at the second end 32B. This limits increases in the static pressure at the second end 32B, thereby decreasing the temperature at the second end 32B. FIG. 9B shows a portion of a dual-sided-discharging cooling structure showing a surface of the wall 15B located at the discharge passage 32. Holes 17C and a hole 17D have the same diameter. The holes 17C differs from the hole 17D in number. The holes 17C may be arranged at an inner side of the wall 15B, that is, a side closer to the discharge port 15A than the hole 17D. For example, the holes 17C are aligned in the same position in the stacking direction X and arranged next to each other in a direction orthogonal to the stacking direction X. The sum of open areas of the holes 17C is greater than the open area of the hole 17D. A large amount of air is discharged particularly from positions toward the discharge port 15A. This limits increases in the static pressure of the central portion 32C of the discharge passage 32 at positions toward the discharge port 15A, thereby decreasing the temperature of the central portion 32C at the positions toward the discharge port 15A.

In the first embodiment and the second embodiment, the second end of the intake passage 31 and the second end of the discharge passage 32 are closed by the wall 16. The member that closes the second ends is not limited to the wall 16. The second ends may be closed by different members. The second end of the intake passage 31 and the second end of the discharge passage 32 may be closed by the end plate 24 instead of the wall 16.

In the embodiments, the wall 15B of the discharge chamber 15 includes the two holes 17. In the first and third embodiments, the two holes 17 may be changed to one hole 17.

In the embodiments, the two holes 17 are included. However, three or more holes 17 may be included.

The battery pack 10 may be used for a vehicle such as an electric car, a hybrid car, a gasoline car, and a diesel car, and other mobile bodies. Alternatively, the battery pack 10 may be installed on a stationary location.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A battery pack, comprising:
  an assembled battery including multiple battery modules that are stacked, wherein a ventilation passage extends between each of the multiple battery modules and an adjacent one of the multiple battery modules, the assembled battery includes a first surface in which the ventilation passage is open and a second surface in which the ventilation passage is open, and the second surface is opposite to the first surface; and
  a cooling structure including: an intake passage disposed at the first surface of the assembled battery and a discharge passage disposed at the second surface of the assembled battery, wherein:
    the intake passage extends in a direction in which the multiple battery modules are stacked,
    the intake passage includes an intake port disposed at a first end of the intake passage in a longitudinal direction to draw in cooling air that is output from a blower,
    the discharge passage extends in the direction in which the multiple battery modules are stacked,
    the discharge passage includes a discharge port at a first end of the discharge passage in a longitudinal direction to discharge the cooling air, which flows through the ventilation passage, to an outside,
    the first end of the discharge passage and the intake port of the intake passage are located at the same side,
    the discharge passage is defined by a wall that includes a side wall extending in the longitudinal direction of the discharge passage,
    the side wall includes a plurality of holes, and
    the plurality of holes is disposed at a position toward a second end of the discharge passage opposite to the first end of the discharge passage to partially discharge air from the discharge passage.

2. The battery pack according to claim 1, wherein
  the plurality of holes include a first hole and a second hole having a greater open area than the first hole, and
  the second hole is located closer to the second end of the discharge passage than the first hole.

3. The battery pack according to claim 1, wherein
the plurality of holes include one or more first holes and multiple second holes,
the multiple second holes are located closer to the second end of the discharge passage than the one or more first holes, and
a sum of open areas of the multiple second holes is greater than a sum of open areas of the one or more first holes.

4. A battery pack, comprising:
an assembled battery including multiple battery modules that are stacked, wherein a ventilation passage extends between each of the multiple battery modules and an adjacent one of the multiple battery modules, the assembled battery includes a first surface in which the ventilation passage is open and a second surface in which the ventilation passage is open, and the second surface is opposite to the first surface; and
a cooling structure including an intake passage disposed at the first surface of the assembled battery and a discharge passage disposed at the second surface of the assembled battery, wherein:
  the intake passage extends in a direction in which the multiple battery modules are stacked,
  the intake passage includes an intake port disposed at a first end of the intake passage in a longitudinal direction to draw in cooling air that is output from a blower,
  the discharge passage extends in the direction in which the multiple battery modules are stacked,
  the discharge passage includes two discharge ports at opposite ends of the discharge passage in a longitudinal direction to discharge the cooling air, which flows through the ventilation passage, to an outside,
  the discharge passage is defined by a wall that includes a side wall extending in the longitudinal direction of the discharge passage,
  the side wall includes a plurality of holes,
  the plurality of holes is disposed in a longitudinal central portion of the discharge passage at a position toward a first end of the discharge passage to partially discharge air from the discharge passage, and
  the first end of the discharge passage and the intake port of the intake passage are located at the same side.

5. The battery pack according to claim 4, wherein
the plurality of holes include a first hole and a second hole having a greater open area than the first hole, and
the second hole is located closer to the first end of the discharge passage than the first hole.

6. The battery pack according to claim 4, wherein
the plurality of holes include one or more first holes and multiple second holes,
the multiple second holes are located closer to a second end of the discharge passage than the one or more first holes, and
a sum of open areas of the multiple second holes is greater than a sum of open areas of the one or more first holes.

* * * * *